United States Patent
Xue et al.

(10) Patent No.: US 8,255,753 B2
(45) Date of Patent: Aug. 28, 2012

(54) ENCODING/DECODING TECHNIQUE FOR REBROADCASTING LOST PACKETS

(75) Inventors: Feng Xue, Santa Clara, CA (US); Xue Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1256 days.

(21) Appl. No.: 11/949,772

(22) Filed: Dec. 4, 2007

(65) Prior Publication Data

US 2009/0144597 A1  Jun. 4, 2009

(51) Int. Cl.
*H04L 1/18* (2006.01)
*G08C 25/00* (2006.01)
*H03M 13/00* (2006.01)

(52) U.S. Cl. ........................ 714/748; 714/752
(58) Field of Classification Search .................. 714/748, 714/749
See application file for complete search history.

(56) References Cited

U.S. PATENT DOCUMENTS

| | | | |
|---|---|---|---|
| 5,671,156 A * | 9/1997 | Weerackody et al. | 714/52 |
| 6,987,780 B2 * | 1/2006 | Wei et al. | 370/469 |
| 7,315,898 B2 * | 1/2008 | Kohno | 709/230 |
| 7,376,880 B2 * | 5/2008 | Ichiki et al. | 714/751 |
| 7,636,298 B2 * | 12/2009 | Miura et al. | 370/216 |
| 7,724,640 B2 * | 5/2010 | Larsson | 370/216 |
| 7,802,168 B1 * | 9/2010 | Apostolopoulos et al. | 714/776 |
| 7,827,458 B1 * | 11/2010 | Salsbury et al. | 714/748 |
| 7,940,644 B2 * | 5/2011 | Oran et al. | 370/216 |

OTHER PUBLICATIONS

Sachin Katti, et al., "XORs in The Air: Practical Wireless Network Coding", SIGCOMM'06, Sep. 11-15, 2006, Pisa, Italy, pp. 243-254.

* cited by examiner

*Primary Examiner* — James C Kerveros
(74) *Attorney, Agent, or Firm* — Schwabe, Williamson & Wyatt, P.C.

(57) ABSTRACT

When retransmitting lost packets of data to multiple devices in a wireless network, the original sequence of packets containing all the lost packets may be encoded into a smaller number of packets for the retransmission. These encoded packets may be collectively addressed to all the intended receiving devices through broadcast or multicast addressing. These encoded packets may then be selectively decoded by the receiving devices, using the successfully received previous packets as part of the decoding process. Repetitive exclusive OR algorithms may be used for encoding and decoding.

22 Claims, 4 Drawing Sheets

$Y_1 = X_1 \oplus X_{L+1} \oplus X_{2L+1} \oplus \ldots \oplus X_{(m-1)L+1};$ $Y_2 = X_2 \oplus X_{L+2} \oplus X_{2L+2} \oplus \ldots \oplus X_{(m-1)L+2};$ $\vdots$ $Y_L = X_L \oplus X_{2L} \oplus X_{3L} \oplus \ldots \oplus X_{mL};$

FIG. 4

$X_{aL+b} = Y_{b\%L} \oplus X_b \oplus X_{L+b} \oplus \ldots \oplus X_{(m-1)L+b};$ $X_{aL+b+1} = Y_{(b+1)\%L} \oplus X_{(b+1)\%L} \oplus X_{L+(b+1)\%L} \oplus \ldots \oplus X_{(m-1)L+(b+1)\%L};$ $\vdots$ $X_{aL+b+c} = Y_{(b+c)\%L} \oplus X_{(b+c)\%L} \oplus X_{L+(b+c)\%L} \oplus \ldots \oplus X_{(m-1)L+(b+c)\%L};$ where % denotes the "mod" operation.

FIG. 5

ENCODING/DECODING TECHNIQUE FOR REBROADCASTING LOST PACKETS

BACKGROUND

In wireless networks, various conditions can cause transmitted information to be received in a corrupted state, or to not be received at all, by the designated receiving device. When these 'lost' packets are identified, they can then be retransmitted, in hopes that the conditions that caused the problem (e.g., interference, marginally weak signal, reflections, etc.) will be sufficiently changed to allow successful completion of the transmission. In a conventional network in which a centralized network controller (e.g., a base station) is transmitting to multiple network devices (e.g., mobile stations), the lost packets are typically retransmitted separately and individually. This separate retransmission of multiple packets can be time consuming and use up valuable bandwidth.

BRIEF DESCRIPTION OF THE DRAWINGS

Some embodiments of the invention may be understood by referring to the following description and accompanying drawings that are used to illustrate embodiments of the invention. In the drawing.

FIG. 4 shows an algorithm for encoding a sequence of packets, according to an embodiment of the invention.

FIG. 5 shows an algorithm for decoding the encoded packets of FIG. 4, according to an embodiment of the invention.

DETAILED DESCRIPTION

Figure 1:
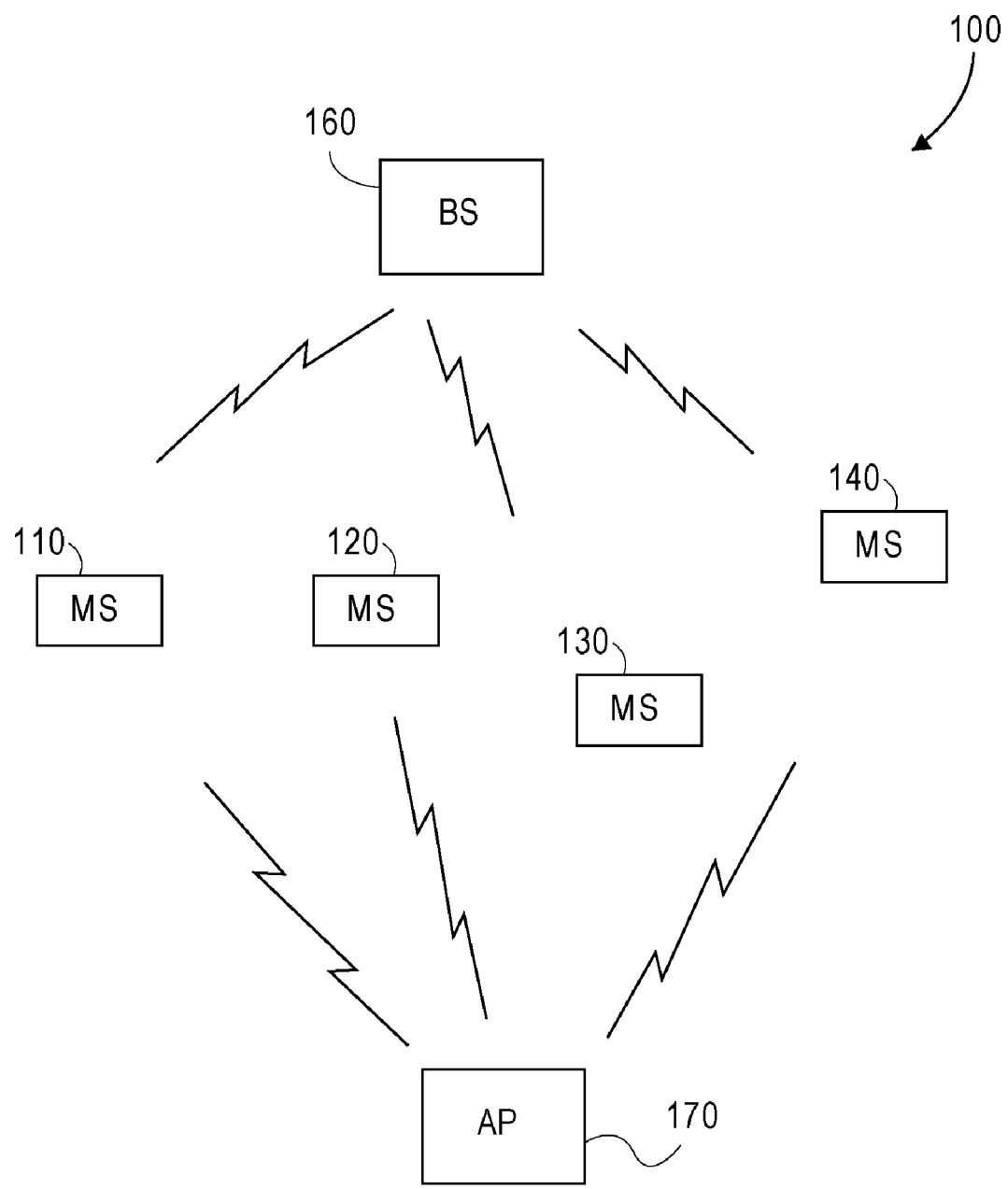
FIG. 1 shows a wireless network, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a computer-readable medium, which may be read and executed by one or more processors to enable performance of the operations described herein. A computer-readable medium may include any mechanism for storing, transmitting, and/or receiving information in a form readable by a one or more computers. For example, a computer-readable medium may include a storage medium, such as but not limited to read only memory (ROM); random access memory (RAM); magnetic disk storage media; optical storage media; a flash memory device, etc.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile wireless device" is used to describe a wireless device that may be in motion while it is communicating.

Various embodiments of the invention pertain to retransmitting lost packets of data in a wireless network. In a communication between wireless devices, one of those devices may transmit a quantity of sequential packets to the other devices. Some of the packets may not be correctly received by one or more of those designated destination devices, and are therefore identified as 'lost' packets. Rather than retransmitting the lost packets separately to each device, the entire series of sequential packets may be encoded into a smaller number of packets by using a series of bit-wise exclusive OR operations, and these encoded packets may be transmitted to the devices that lost packets. Each receiving device may then selectively reconstruct its lost packets by decoding at least a portion of the encoded packets, using some of its correctly-received packets as part of the decoding process. The described technique will permit this selective reconstruction if each receiving device is missing only a single block of consecutive packets, and if the block of missing packets does not contain more that a pre-defined number of packets. However, in some selected situations, a correctly-received packet may be treated as incorrectly received to meet these requirements. For example, if only two packets are missing, and these are separated by only a single intervening packet in the original sequence, these three may be treated as three consecutive missing packets so that the technique may still be used.

Within the context of this document, a packet is not correctly received if any of the following occur:

1) the packet is not recognized by the intended device;
2) the packet is recognized but not fully received;
3) the packet is fully received, but fails an integrity check (e.g., parity checks, CRC, etc. that indicate whether the data was all received correctly), and the errors cannot be corrected without further communications with the transmitting device;
4) from the point of view of the transmitting device, a packet is also considered not correctly received if the transmitting device does not receive an expected acknowledgment from the intended receiving device, regardless of whether that acknowledgment was actually sent by the intended receiving device.

FIG. 1 shows a wireless network, according to an embodiment of the invention. In the illustrated network 100, mobile stations 110, 120, 130, and 140 may communicate with a base station 160 (e.g., in a WiMAX network), and also with an access point 170 (e.g., in a WiFi network), using the techniques disclosed herein to recover lost packets. The mobile stations are shown as multi-radio platforms (i.e., wireless devices that can communicate in multiple dissimilar networks), because multi-radio platforms are prime candidates for losing consecutive packets, due to the conflicting and uncoordinated scheduling of communications in the two networks. However, various embodiments of the invention can also be applied to wireless networks of other types, such as single-radio platforms, zones of network operation that overlap between adjacent networks, etc. As long as a single network coordinator communicates with multiple devices, the chance of lost packets is possible and techniques to recover those lost packets are needed.

Figure 2:
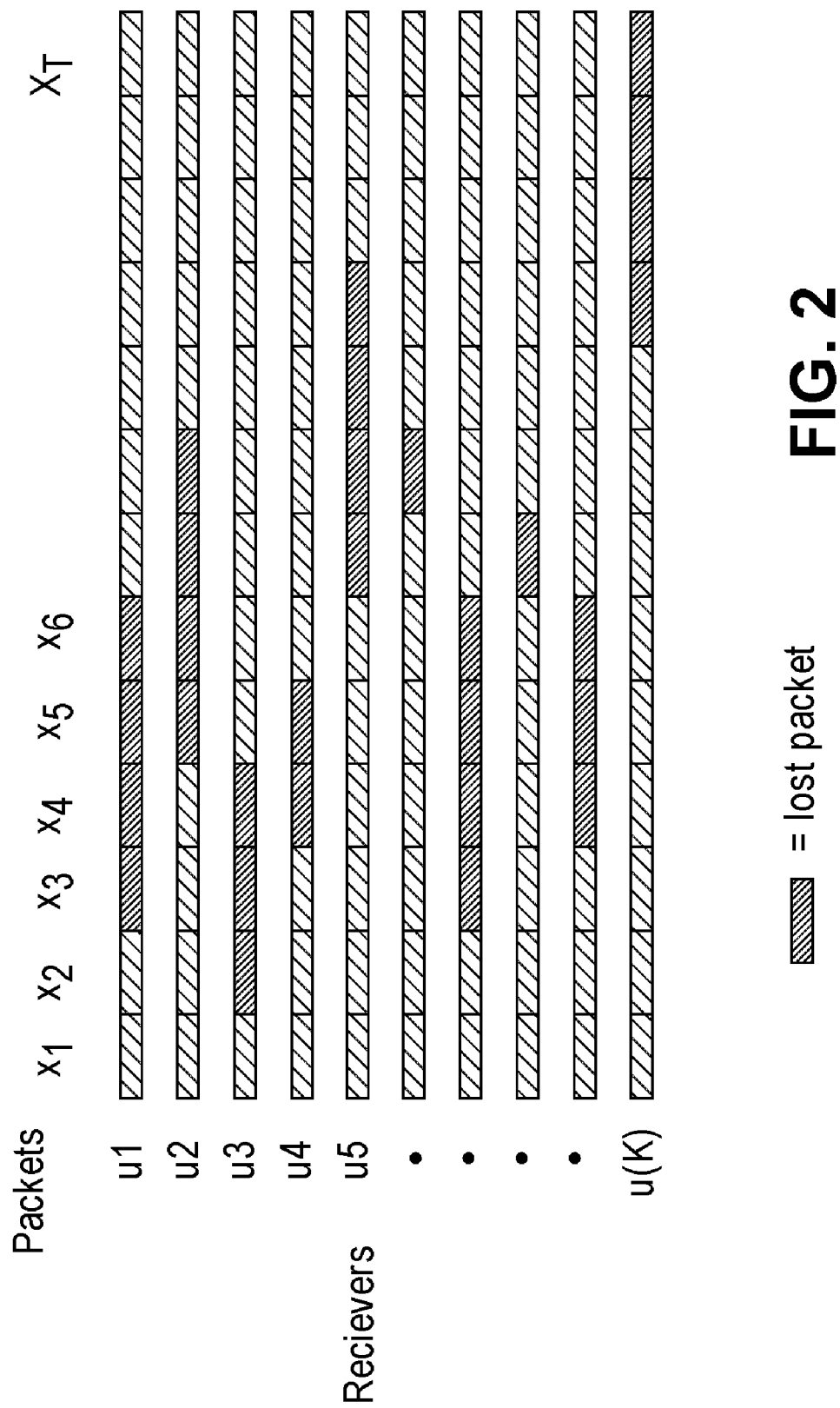
FIG. 2 shows a series of packets being transmitted to multiple receivers, according to an embodiment of the invention.

FIG. 2 shows a series of packets being transmitted to multiple receivers, according to an embodiment of the invention. A receiver may be a mobile station, STA, or any other device that communicates wirelessly with a centralized network controller. The same inventive concept applies regardless of the label attached to the various devices in the network. The example shows a series of wireless packets, labeled $X_1$-$X_T$, being transmitted to multiple mobile stations, which are labeled u1-u(K). The particular diagram shows 13 packets being transmitted (T=13), but any other feasible number of packets may be used. It is important to note that T is the number of packets that we are concerned with for the encoding/decoding operations described herein. The original transmission may also contain additional packets that are ignored in these descriptions because they are not needed and/or are not relevant to the packet recovery process. This example shows all the packets being transmitted sequentially without any intervening breaks, such as might be the case if every packet was in the same single frame. However, other embodiments may break up this sequence of packets into multiple frames, or otherwise create a disjointed series of packets. As along as every receiver perceives the same packets to be received in the same consecutive order, the underlying principles may still be applied.

All packets are intended to be received by all the indicated receivers. In some embodiments, all the indicated packets are addressed to all the indicated receivers, for example, by using the same broadcast address or the same multicast address for all packets. In other embodiments, different packets may internally contain different destination addresses, and the different packets may therefore be addressed to different devices or groups of devices. However, for the following techniques to work properly, each destination device needs to receive and save all the packets in the sequence that it can correctly receive, even if some of those packets are not addressed to that device.

In the example, the darker packets indicate the packets that the specified receiver did not receive correctly. In this example, every receiver lost at least one packet, though in actual operation some receivers may correctly receive all the packets. For the technique to work properly, each receiver may lose only one block of consecutive packets in a particular sequence of T packets, and the other packets in the sequence must be received correctly. However, each receiver may lose a different block of packets than the other receivers. For the technique to work properly, each receiver may lose no more than some predetermined number consecutive packets, and this parameter must be the same for all the receivers. The example limits this value to four consecutive packets for all the receivers, but other examples may use other quantities.

Figure 3:
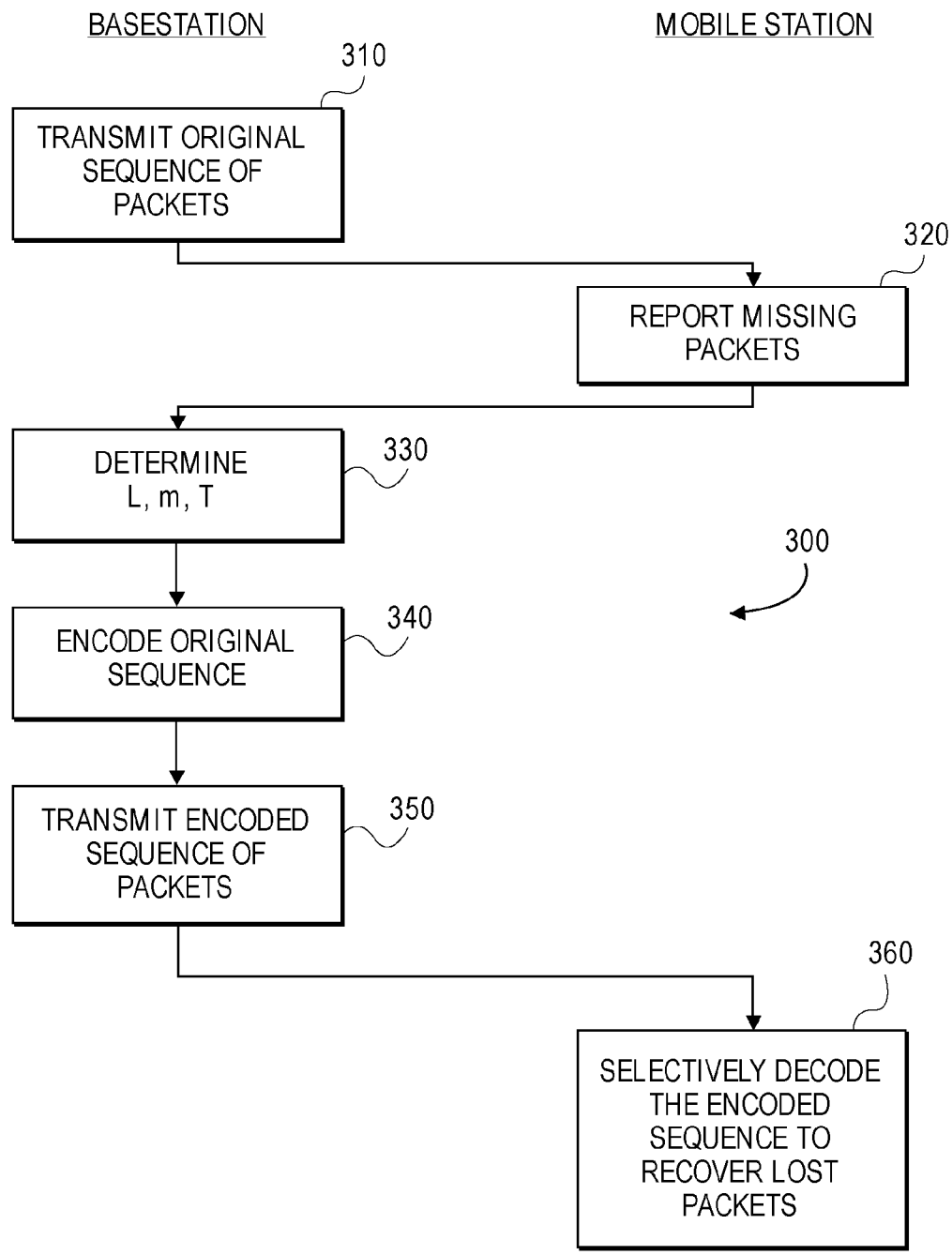
FIG. 3 shows a flow diagram of a method of recovering lost packets in a wireless network, according to an embodiment of the invention.

FIG. 3 shows a flow diagram of a method of recovering lost packets in a wireless network, according to an embodiment of the invention. For ease of description, FIG. 3 is described in terms of a base station communicating with a mobile station, but these terms are not intended to limit the scope of the invention to devices that use these labels. In flow diagram 300, at 310 a base station may transmit the original sequence of packets addressed to a group of multiple mobile stations. This sequence comprises a group of multiple packets that are transmitted with a defined order, an order which can be understood and/or reconstructed by the mobile stations that the sequence is intended for. In some embodiments, each packet will contain a sequence number or other unique identifier that distinguishes it from the other packets in the sequence, and also defines where it fits within the sequence. Although labeled as a 'sequence', the packets may be separated into different groups for ease of transmission. For example, a sequence may consist of a defined group of packets within a single communications frame, or may be broken into multiple groups of packets that are transmitted in different frames. Also, the packets may be transmitted on different channels (e.g., in orthogonal frequency divisional multiplexing). As long as the sequence can be reconstructed at the receiver, the details of actual transmission may not be important. In other embodiments, the order may be defined by the temporal order in which the packets are received, and individual packet numbers may not be necessary. Regardless of how the packets are transmitted and received, if the packets can be reassembled into the correct order at the receiver, this correct order defines what packets occupy which positions in the 'sequence' of packets, and also which packets are considered 'consecutive' packets.

After receiving the original sequence, at 320 each mobile station may report, in a notification back to the base station, which packets in the original sequence the mobile station did not receive (only a single mobile station is shown in FIG. 3, but each of multiple mobile stations may perform this operation). In some instances, the mobile station can notify the base station about the missing packets by sending a message to the base station listing which packets it did not receive correctly. For example, if the mobile station can tell which packets it missed by looking for a lack of continuity in the sequence numbers of the packets that it did receive correctly, it can transmit a message listing those missing sequence numbers. In other instances, the mobile station may notify the base station about the missing packets passively, simply by not sending an acknowledgement to the base station for those packets. Other techniques of reporting/notification may also be used and/or combined. Regardless of the manner of notification, the base station may be informed of which packets were lost by each of the mobile stations.

After determining which packets were not correctly received by the various mobile stations, the base station may prepare for the encoding process by determining parameters L, m and T at 330. These parameters are described in more detail later, in the description of FIG. 4. In some embodiments, all these parameters may be based on which packets were reported as being lost by the various mobile stations, but in other embodiments, some or all of these parameters may be predetermined. If any of these parameters are not predetermined, they may later be transmitted to the mobile stations so the mobile stations will have the right parameters for decoding.

At 340, the base station may perform the encoding process, which is described in more detail later in connection with FIG. 4, to produce a sequence of encoded packets. This sequence of encoded packets may contain fewer packets than the original sequence. The sequence of encoded packets may then be transmitted to the mobile stations at 350. In some embodiments, the encoded sequence may be addressed to the same group of mobile stations that the original sequence was addressed to. In other embodiments, the encoded sequence may be addressed only to mobile stations that reported missing packets. Other combinations of addresses may also be used. At 360, each particular mobile station may selectively decode the encoded sequence to reconstruct those packets that the particular mobile station did not receive correctly in the original sequence. The details of the encoding and decoding process are described in FIGS. 4 and 5, respectively.

FIG. 4 shows an algorithm for encoding a sequence of packets, according to an embodiment of the invention. This algorithm may be used in a base station, for example, to encode a sequence of previously-transmitted packets in a manner that will permit lost packets from that sequence to be recovered in the mobile stations. In this example, each X represents one of the packets in the original sequence, while each Y represents one of the encoded packets resulting from the encoding algorithm. Collectively, the X packets represent the original sequence and the Y packets represent the encoded sequence. The subscripts represent the order of each packet in its respective sequence, regardless of how 'order' is defined (e.g., temporal order, assigned sequence numbers, etc.). For example, $X_1$ would be the first packet in the original sequence, $X_{10}$ the tenth packet in the original sequence, etc. Similarly, $Y_1$ would be the first packet in the encoded sequence, $Y_3$ would be the third packet in the encoded sequence, etc.

Values for the variables 'L' and 'm' are used to indicate which packet in the sequence is being referred to. The value of L represents the maximum number of consecutive lost packets that may be reconstructed using this technique, and the value of L must be defined before beginning the encoding process. The value of m represents T divided by L, with any fractional result being rounded up (T was defined in FIG. 2 as the total number of packets in the original sequence that we are concerned with for this algorithm—the original transmission may have also contained additional packets before and/or after this sequence that are not involved in this operation). For instance, in the example of FIG. 2., T=13 (13 packets in the original sequence), L=4 (no more than 4 consecutive lost packets for any receiver), and m=4 (T/L=13/4, rounded up to the next integer=4). If there are less than m*L packets in the original sequence (for example, because of the rounding process used in determining m), null packets (for example a packet of all zero's, though a null packet may be any packet that is predefined as a null packet) may be artificially created for these calculations to be used in the encoding process. Again, using FIG. 2 as an example, there are only 13 packets, but m*L=16. So 3 null packets may be created for the calculations in FIG. 4, and later be discarded by the mobile stations after decoding. As can be seen, the encoding process will produce a quantity L of the Y packets, which will be transmitted to the receivers that reported losing packets in the original transmission. Since m is less than T, the number of Y packets in the encoded sequence should not be greater than the number of X packets in the original sequence, and will generally be much less.

The encoding process involves repeatedly applying a bit-wise repetitive exclusive OR process (subsequently referred to herein as RXOR) on a series of packets. RXOR is defined as a process of:

1) performing an exclusive OR operation on the corresponding bits of two packets, 2) performing an exclusive OR operation on the corresponding bits of the next packet with the results of the last exclusive OR operation, 3) repeating step 2) at least until all the packets in the series have been operated on.

If different packets contain different numbers of bits, a default size for all the packets may be chosen (large enough to encompass the largest packet), and predefined characters (for example, all 0's, or all 1's, though the embodiments of the invention may not be limited to this) may be appended to the packets to make them all the same size for this operation. The mobile stations may later remove these appended bits after decoding the packets.

Selected X packets from the original sequence are used to generate each encoded Y packet, with every Lth X packet being used to generate a particular Y packet. For example, if L=4, then $Y_1$ may be generated by performing the RXOR operation on $X_1$, $X_5$, $X_9$, etc. $Y_2$ may be generated by performing the RXOR operation on $X_2$, $X_6$, $X_{10}$, etc. When the encoding process is complete, packets $Y_1$ through $Y_L$ may be transmitted in a sequence to the devices that reported missing packets.

FIG. 5 shows an algorithm for decoding the encoded packets of FIG. 4, according to an embodiment of the invention. This algorithm may be performed, for example, in a mobile station that needs to recover one or more lost packets from an original sequence of packets, by decoding packets that were encoded using the process of FIG. 4. As before, Y packets represent the encoded packets generated in FIG. 4, while X packets represent the packets of the original sequence. In particular, X packets to the left of the equal sign are the lost packets that are to be reconstructed using these algorithms, while X packets to the right of the equal sign are the packets in the original sequence that were correctly received and are therefore available for use in this process. As with the encoding operation, an RXOR algorithm is also used for the decoding operation.

The subscripts are used to represent the previously defined order of the packets. L and m have the same meaning previously defined for them. The letter 'a' represents the number of the segment that the first consecutive lost packet was located in (beginning with a=0 for the first segment in the sequence), where each segment contains L packets. For example, if L=4, the first four packets of the original sequence are in segment 0, the next four packets are in segment 1, etc. The letter 'b' represents the position of the first lost packet within the defined segment (beginning with b=1 for the first position in the segment). For example, if the first consecutive lost packet is the third packet within the second segment, then b=3, while a=1. Since these decoding algorithms may be used to decode multiple consecutive lost packets, the letter 'c' represents the number of additional consecutive lost packets (after the first one) in this particular group of consecutive lost packets. For example, if the $2^{nd}$, $3^{rd}$, and $4^{th}$ packets of the fifth segment were lost, then a=4 (the fifth segment), b=2 (the first lost packet was the second packet in that segment), and c=2 (two additional consecutive lost packets after the first lost packet). It is possible for the group of consecutive lost packets to span two different segments, but the indicated algorithms will still work, as long as the letters a and b correctly identify the first of the consecutive lost packets.

In addition to the variables L, m, a, b, and c, a modulo operation, commonly indicated by the term 'mod' in mathematical expressions, is used in identifying some of the packets. In FIG. 5, the commonly-used term 'mod' has been replaced with the symbol '%' to avoid the confusion that might result since the letter m is already being used as a variable. As an example of modulo operation, the term b % L means the integer remainder that is left after b is divided by L. For example, if b=3 and L=4, (3 divided by 4)=(0 plus a remainder of 3), so $Y_{b \% L} = Y_3$. Using these subscript notations to denote the position of the indicated packet in the sequence, the decoding process shown in FIG. 5 can be used to decode each of multiple lost packets from the original sequence, where $X_{aL+b}$ is the first of the consecutive lost packets in a group of consecutive lost packets, and $X_{aL+b+c}$ is the last of the lost packets in that group.

The preceding paragraphs, in combination with FIGS. 4 and 5, provide a mathematical description of the algorithms that encode and decode packets for the purpose of efficiently retransmitting packets that were lost from the original sequence. A less mathematical description may be summarized as follows:

1) If the original sequence is conceptually divided into segments of the same length, then the first Y packet is generated by using the RXOR operation on the first packet of every segment, the second Y packet is generated by using the RXOR operation on the second packet of every segment, etc., until every packet has been operated upon.

2) If necessary for step 1), null bits may be added to packets to make them the same length, and null packets may be created to provide a uniform number of packets for each Y calculation.

3) For decoding, reconstructing the $b^{th}$ packet of a particular segment is done by using the RXOR operation on the packet $Y_b$ and on the $b^{th}$ packet of every segment (except for the segment containing the $b^{th}$ packet that is being reconstructed)

4) If null bits or null packets were created by the transmitting device in step 2), they may be discarded by the receiving device after step 3).

The encoding and/or decoding operations described herein may be performed in various ways, such as but not limited to: 1) dedicated circuitry, 2) reconfigurable circuitry, 3) firmware, 4) software, 5) any combination of these, 6) etc.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A method, comprising:
   wirelessly transmitting a first set of multiple packets to a plurality of wireless communications devices;
   encoding the first set of multiple packets into a second set of multiple packets, wherein a first packet of the second set of multiple packets is based on a plurality of packets from the first set of multiple packets and said encoding is based on a predetermined number of consecutive packets of the first set of multiple packets that individual wireless communications devices are capable of receiving incorrectly while still being able to successfully decode the first set of multiple packets with use of the second set of multiple packets; and
   wirelessly transmitting the second set of multiple packets to the plurality of wireless communications devices.

2. The method of claim 1, wherein said encoding comprises creating each packet in the second set by performing a series of repetitive exclusive OR operations on selected packets in the first set.

3. The method of claim 2, wherein every packet in the first set is encoded into the second set and a number of packets in the second set is less than a number of packets in the first set.

4. The method of claim 1, wherein a value of the number of packets in the second set is equal to the predetermined number of consecutive packets.

5. The method of claim 1, wherein the first set of multiple packets and the second set of multiple packets are wirelessly transmitted to the plurality of wireless communications devices using a common address that is a multicast address or a broadcast address.

6. The method of claim 1, further comprising:
   wirelessly transmitting the first set of multiple packets to a third wireless communications device;
   receiving notification that the third wireless communications device correctly received all packets of the first set; and
   not transmitting the second set of multiple packets to the third wireless communications device.

7. The method of claim 1, wherein the predetermined number is shared by all of the plurality of wireless communications devices.

8. The method of claim 1, wherein the first packet is $Y_1$ and is given by:
   $Y_1 = X_1 \oplus X_{L+1} \oplus X_{2L+1} \oplus \ldots \oplus X_{(m-1)L+1}$,
   where the first set is $X_1 \ldots X_{(m-1)}$, and L is the predetermined number.

9. An article comprising a tangible computer-readable medium that contains instructions, which when executed by one or more processors result in performing operations comprising:
   wirelessly transmitting a first set of multiple packets to a plurality of wireless communications devices;
   encoding the first set of multiple packets into a second set of multiple packets, wherein a first packet of the second set of multiple packets is based on a plurality of packets from the first set of multiple packets and said encoding is based on a predetermined number of consecutive packets of the first set of multiple packets that individual wireless communications devices are capable of receiving incorrectly while still being able to successfully decode the first set of multiple packets with use of the second set of multiple packets; and
   wirelessly transmitting the second set of multiple packets to the plurality of wireless communications devices.

10. The medium of claim 9, wherein the operation of encoding comprises creating each packet in the second set by performing a series of repetitive exclusive OR operations on selected packets in the first set.

11. The medium of claim 10, wherein the operations further comprise encoding every packet in the first set into the second set and a number of packets in the second set is less than a number of packets in the first set.

12. The medium of claim 9, wherein a value of the number of packets in the second set is equal to a value of the predetermined number of consecutive packets.

13. The medium of claim 9, wherein the operations of wirelessly transmitting the first set of multiple packets and the second set of multiple packets to the plurality of wireless communications devices comprises using a common address that is a multicast address or a broadcast address.

14. The medium of claim 9, wherein the operations further comprise:
   wirelessly transmitting the first set of multiple packets to a third wireless communications device;
   receiving notification that the third wireless communications device correctly received all packets of the first set; and
   not transmitting the second set of multiple packets to the third wireless communications device.

15. A method, comprising:
wirelessly receiving a first set of packets containing an encoded version of a previous communication in which only a single set of consecutive packets in the previous communication was incorrectly received and a remainder of the packets in the previous communication was correctly received; and
decoding at least a portion of the first set of packets to construct one of the incorrectly received packets;
wherein said decoding comprises operating on one of the packets in the first set and on multiple ones of the correctly received packets from the previous communication, using a repetitive exclusive OR process.

16. The method of claim 15, further comprising repeating said decoding, using a different one of the packets in the first set and different multiple ones of the correctly received packets from the previous communication, to construct a second one of the incorrectly received packets.

17. The method of claim 15, wherein said first set of packets is addressed to multiple destination devices.

18. The method of claim 15, wherein a first packet of the incorrectly received packets is $X_{aL+b}$ and is given by:
$$X_{aL+b} = Y_{b\%L} \oplus X_b \oplus X_{L+b} \oplus \ldots \oplus X_{(m-1)L+b},$$
where % represents a mod operation, the first set of packets is $Y_1 \ldots Y_L$, m * L is a number of packets in the previous communication, and a, b, and c are non-negative integers.

19. An article comprising a tangible computer-readable medium that contains instructions, which when executed by one or more processors result in performing operations comprising:
wirelessly receiving a first set of packets containing an encoded version of a previous communication in which only a single set of consecutive packets in the previous communication was incorrectly received and a remainder of the packets in the previous communication was correctly received; and
decoding at least a portion of the first set of packets to construct one of the incorrectly received packets; wherein said decoding comprises operating on one of the packets in the first set and on multiple ones of the correctly received packets from the previous communication, using a repetitive exclusive OR process.

20. The medium of claim 19, wherein said operations further comprise repeating said decoding, using a different one of the packets in the first set and different multiple ones of the correctly received packets from the previous communication, to construct a second one of the incorrectly received packets.

21. The medium of claim 19, wherein said operations further comprise receiving at least one parameter for said decoding, the at least one parameter being based at least partly on which packets of the previous communication were incorrectly received.

22. The medium of claim 19, wherein said operations further comprise:
operating a plurality of collocated radios of a multi-radio platform, the plurality of collocated radios including a first radio that is a WiFi radio and a second radio that is a WiMAX radio.

* * * * *